United States Patent [19]

Vriens et al.

[11] Patent Number: 5,061,993

[45] **Date of Patent: * Oct. 29, 1991**

[54] PROJECTION TELEVISION DISPLAY DEVICE

[75] Inventors: Leendert Vriens; Johannes H. M. Spruit; Johannes C. N. Rijpers, all of Eindhoven, Netherlands

[73] Assignee: U.S. Philips Corporation, New York, N.Y.

[ * ] Notice: The portion of the term of this patent subsequent to Jan. 6, 2004 has been disclaimed.

[21] Appl. No.: 273,731

[22] Filed: Nov. 14, 1988

Related U.S. Application Data

[63] Continuation of Ser. No. 891,985, Jul. 30, 1986, abandoned.

[30] Foreign Application Priority Data

Aug. 12, 1985 [NL] Netherlands ........................ 8502226

[51] Int. Cl.[5] ........................ H04N 5/74; H04N 9/31

[52] U.S. Cl. ........................ 358/64; 358/237; 358/253

[58] Field of Search ............... 358/231, 237, 238, 239, 358/60, 64; 313/461, 466

[56] References Cited

U.S. PATENT DOCUMENTS

| | | | |
|---|---|---|---|
| 2,642,487 | 6/1953 | Schroeder | 358/64 |
| 4,249,205 | 2/1981 | Buchroeder | 358/60 |
| 4,636,926 | 1/1987 | Vriens | 358/253 |
| 4,642,695 | 2/1987 | Iwasaki | 358/237 |
| 4,683,398 | 7/1987 | Vriens | 358/253 |

FOREIGN PATENT DOCUMENTS

| | | | |
|---|---|---|---|
| 2330898 | 1/1975 | Fed. Rep. of Germany . | |
| 139536 | 8/1984 | Japan | 358/64 |
| 139537 | 8/1984 | Japan | 358/64 |
| 1306335 | 2/1973 | United Kingdom . | |

OTHER PUBLICATIONS

A Single-Lens Three-CRT Crossed Dichroic Color Projector for Data and Video, by Terry Schmidt, SID 1985 Digest, pp. 270-273.

*Primary Examiner*—Tommy P. Chin
*Attorney, Agent, or Firm*—John C. Fox

[57] ABSTRACT

Projection television display device includes three monochrome projection television display tubes (20, 21, 22) each having a display screen (24, 25, 26) which is provided on the inside of the display window (23) and luminesces in a different color. Each tube has an optical axis extending perpendicularly from the center of the display screen, the optical axes (33, 34, 35) of the three display screens being co-planar. The axes (34, 33) of the display screens of the first and second tubes (20, 22) coincide and the axis (35) of the display window of the third tube (21) constitutes the main axis of the device, this axis being perpendicular to the two coincident axes (33, 34). Two flat dichroic intersecting reflective mirrors (27, 29) extend perpendicularly of the plane and through the point of intersection of the axes, each at an angle of 45° with the main axis. The first mirror (27) reflects the image of the first display screen and the second mirror (29) reflects the image of the second display screen into the direction of the main axis and away from the third display screen, interference filters being disposed between the display screens and mirrors for passing the desired color of light. With interference filters disposed between the luminescent material of the display screens and the display windows, the reflection greatly increases for light rays constituting an angle of more than 20° to 35° with the normal of the filter. When there is substantially no transmission up to 90°, there is a gain in brightness by a factor of 1.5 to 2, a gain in contrast by more than a factor of 2 and also a considerable color improvement and reduction of color errors when the conventional green and blue phosphors are used.

5 Claims, 2 Drawing Sheets

PROJECTION TELEVISION DISPLAY DEVICE

This application is a continuation of U.S. application Ser. No. 891,985, filed on July 30, 1986, now abandoned, which is continuation in part of U.S. application Ser. No. 662,311 filed Oct. 18, 1984, now U.S. Pat. No. 4,634,926.

BACKGROUND OF THE INVENTION

The invention relates to a projection television display device comprising three monochrome projection television display tubes each having a display screen which is provided on the inside of the display window of the tube and luminesces in a different colour. Each tube has an optical axis extending perpendicularly from the centre of the display screen, the optical axes of the three display screens being co-planar and the axes of the display screens of the first and second tubes coinciding and the axis of the display window of the third tube constituting the main axis of the device, said axis being perpendicular to the two coincident axes. The device has two flat dichroic intersecting reflective mirrors extending perpendicularly of the plane and through the point of intersection of the axes and each constituting an angle of 45° with the main axis. The first mirror reflects the image of the first display screen and the second mirror reflecting the image of the second display screen into the direction of the main axis and away from the third display screen, filters being disposed between the display screens and mirrors for passing the desired colour of light.

In this manner the monochrome images generated on the three display screens are combined and displayed as one colour image on the projection screen.

A projection television display device of this type is known from Japanese Patent Application 59-139537. In this device absorption filters (coloured glass) are used between the display screens and the mirrors in order to reduce colour errors and loss of contrast. In the Japanese Patent Application 59-139536 pigmented phosphors are used for the same purpose.

A projection television display device of this type without the filters has extensively been described in the article "A Single-Lens Three CRT Crossed Dichroic Color projector for Data and Video", Terry C. Schmidt, Electrohome Limited, Kitchener, Ontario, Canada, SID 85 Digest, P 270-3 which is hereby incorporated by reference.

In the German Patent Application 2330898 laid open to public inspection a display tube has been described in which a multilayer interference filter is used between the luminescent material (the phosphor) and the display window. For the layer thicknesses an optical thickness of less than 0.25λ or between 0.5 and 0.75λ is chosen for the layers of the filter consisting of a material having a high refractive index, with λ being the wavelength of the light emitted by the luminescent material. For the layers of the filters consisting of material having a low refractive index an optical thickness of 0.25λ or an odd multiple thereof is chosen. The filter changes the light radiation characteristic of the display screen of the tube in such a manner that the quantity of light radiated within a limited angular aperture increases by 25% as compared with a tube without a filter. The contrast in the generated image is also increased due to a reduction in background brightness.

British Patent Specification 1,306,335 describes a similar display tube in which a passband interference filter is disposed between the phosphor and the display window. This filter consists of layers having an optical thickness of 0.25λ and has the following design:

S L H L L L L L L H L H L L L L L L H L H L L L L L L H in which S is the display window, L denotes layer of a material having a low refractive index and H denotes layers of a material having a high refractive index. Such a filter may also be defined as follows:

$$S\,L\,H\,(L)^6\,H\,L\,H\,(L)^6\,H\,L\,H\,(L)^6\,H$$

Due to the presence of the six mating layers having a low refractive index $(L)^6$ a Fabry-Perot filter is formed. For a given choice of the optical layer thickness this filter has a desired transmission band for light rays constituting an angle of less than 25° to 35° with the normal of the filter. In addition, however, there is an unwanted broad transmission band for light rays constituting an angle of between 55° to 90° with the normal. All the light passed in this band is lost or contributes to what is referred to as the halo and thereby to a loss of contrast in the displayed image. This will be further explained hereinafter. Moreover, the cryolite layers used in this filter and hygroscopic and remain soft so that the filter may easily be damaged. The zinc sulphide (ZnS) layers used in this filter easily oxidise when firing the tube at approximately 475° C. so that they are less suitable for use in television display tubes.

German Patent Application 3440 173 laid open to public inspection describes a projection television display tube having a six-layer interference filter between the phosphor and the display window. When such a filter is used, light is also radiated at relatively large angles with the normal on the display screen, as is apparent from the Figures. Projection television display tubes having interference filters have also between described in the non-prepublished prior Netherlands Patent Application 8402034 to which U.S. Pat. No. 4,634,926 corresponds, hereby incorporated by reference, and the non-prepublished British Patent Application 8513558 to which U.S. Pat. Nos. 4,683,398 corresponds hereby incorporated by reference.

SUMMARY OF THE INVENTION

Interference filters are disposed between the luminescent material of the display screen and the display windows, the reflection greatly increasing for light rays constituting an angle of more than 20° to 35° with the normal on the filter. For larger angles, up to 90°, there is substantially no transmission. In projection television display devices having dichroic mirrors and interference filters with a greatly limited transmission angle according to the invention, there is a gain in contrast by more than a factor of 2 in addition to a brightness gain by a factor of 1.5 to 2 and when the conventional green and blue phosphors are used there is also a considerable improvement in colour. In projectors of the type using dichroic mirrors the lens for projection on the projection screen may be entirely or partly located at a further distance than in projectors in which a complete lens is located in front of each display screen. The variation in angles of acceptance of the lens in a projection device using dichroic mirrors may therefore be smaller. By using interference filters having a greatly limited transmission angle according to the invention, much gain in brightness can be obtained throughout the display screen. The interference filters also ensure spectral filtering, particularly filtering out the long-wave spectral components. When there are no interference filters, the dichroic mirrors do not reflect for the blue phosphor or pass (for the green phosphor) these long-wave spectral components in the correct manner, which leads to a colour variation across the projection screen and also to loss of contrast through multiple reflections. When interference filters according to the invention are used, that is to say, in combination with the dichroic mirrors, these problems are obviated or reduced to a considerable extent. Unlike the use of absorption filters are pigmented phosphors in combination with dichoric mirrors, in which colour variation is obviated or reduced at the expense of luminous flux, a gain in luminous flux is achieved when interference filters according to the invention are used.

Each intereference filter preferably has at least six layers alternately made from a material having a high reference index and from a material having a low refractive index, each layer having an optical thickness nd, where n is the reflective index of the material of the layer and d is the thickness, which optical thickness nd is between $0.2\lambda_f$ and $0.3\lambda_f$, where $\lambda_f$ is equal to $p \times \lambda$, where $\lambda$ is the desired central wavelength selected from the spectrum emitted by the luminescent material of the relevant display screen and p is a number between 1.18 and 1.32. The average optical thickness is $0.25\lambda_f$ and $\lambda_f$ is the central wavelength of the filter. On a frequency scale $1/\lambda_f$ corresponds to the centre of the reflection band an perpendicular incidence of the light. The display window on the display screen side is flat to convex having a maximum angle of curvature $\phi = 18°$ where $\phi$ is the angle between the optical axis and a line perpendicular to the part of the display screen which is most remote from the centre of the display screen. A preferred embodiment of a projection television display device according to the invention which presents a very good transmission characteristic is characterized in that each interference filter is composed of 14 to 30 layers.

A filter used in the inventive device thus consists exclusively or substantially exclusively of layers having an optical thickness of approximately $0.25\lambda_f$. This gives the filter the special property of the very broad reflection band (no transmission) for light rays at an angle of between 20° to 35° and 90° with the normal to the filter.

For $0.75\lambda_f$ and $1.25\lambda_f$ filters the width of the reflection band is reduced by a factor of 3 and a factor of 5, respectively, and there is an unwanted transmission in the case of large angles. As a result the gain luminous flux in the forward direction, hence for light rays constituting small angles with the normal on the filter, as in German Patent Application 2330898 is limited to 25% in similar filters. There is also less gain in contrast. The Fabry-Perot filter described in British Patent Specification 1,306,335 has three $1.5\lambda$ layers (each consisting of six $0.25\lambda$ layers from a material having a low refractive index) and has also an unwanted broad transmission band for light rays constituting large angles with the normal on the filter. The layers thicknesses in the filter according to the invention are thus chosen to be such that the reflection at a desired wavelength greatly increases for light rays from the luminescent material at an angle of more than 20° to 35° with the normal to the filter. The broad reflection band ensures that light rays at angles of more than 20° to 35° are reflected as much as possible and after dispersion in the luminescent material can again be allowed to emit from the tube in the forward direction, this is to say, within an angle of not more than 20° to 35° with the normal on the filter. Consequently, there will be a maximum luminous flux in the forward direction, which is at least 50% larger than without use of the filter. In addition, the broad reflection band ensures a greatly reduced halo effect and less emission of light at large angles. The optical thickness nd of the layers of the filter is preferably not equal for all layers, but varies between $0.2\lambda_f$ and $0.3\lambda_f$ and preferably between $0.23\lambda_f$ and $0.27\lambda_f$ as will be described with reference to an embodiment. This variation in thickness leads to a more plain pass characteristic of the filter. Since the pass characteristic of the filter is dependent on the wavelength it is possible to improve the colour point of the light rays passing through the filter within an angle of 20° to 35° with the normal by combination of a phosphor and an adapted filter. The display screen side of the display window is generally flat. It may, however, alternatively be made convex with an angle of curvature $\phi$ of between 0° and 18°. For a 5" display screen diagonal this corresponds to a radius of curvature between infinitely large for a flat screen and a radius of curvature R=200 mm.

In a projection television display device according to the invention the value of the number p is between 1.18 and 1.32, dependent on the refractive index of the layers used and on the width of the selected wavelength.

DETAILED DESCRIPTION OF THE PREFERRED EMBODIMENT

Figure 1:
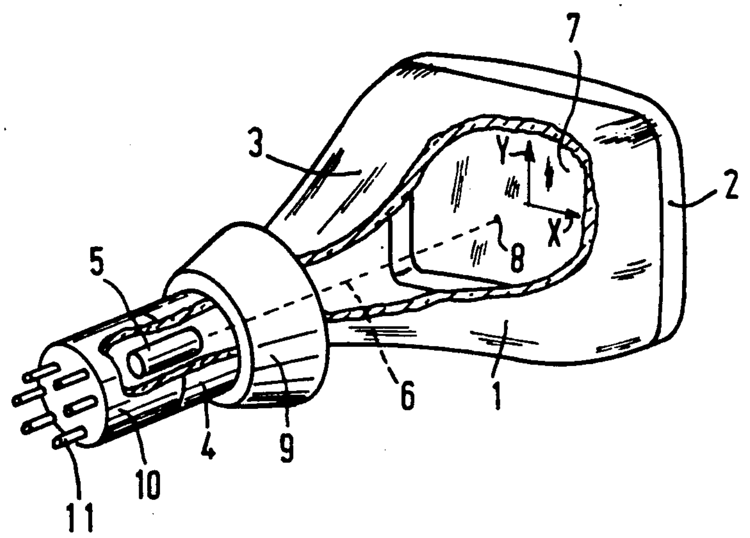
FIG. 1 is a cut away perspective of a projection television display tube.

FIG. 1 shows a projection television display tube for a device according to the invention. The tube has a glass envelope 1 consisting of an inwardly curved display window 2, a cone 3 and a neck 4. The neck accommodates an electron gun 5 for generating an electron beam 6. This electron beam is focused on a display screen 7 which is likewise curved so as to form a spot 8 thereon. This display screen 7 is provided on the inside of the display window 2. The electron beam is deflected across the display screen in two mutually perpendicular directions x, y by means of a system of deflection coils 9. The tube has a base 10 with connection pins 11.

Figure 2:
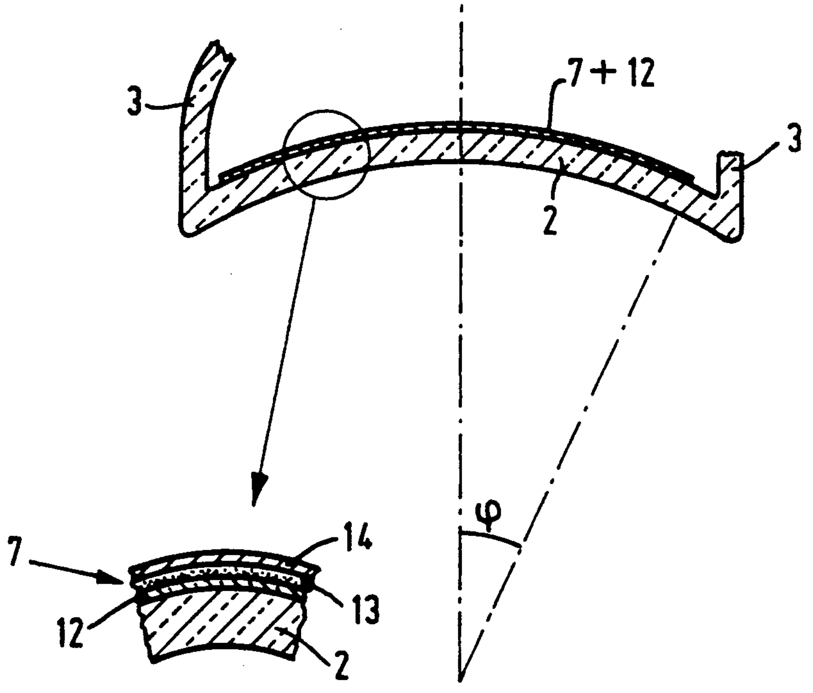
FIG. 2 is a partially cross-section of a curved display screen, the filter and the curved display window of the tube of FIG. 1, FIG. 3 schematically shows the composition of a filter as is used in the tubes.

FIG. 2 shows the curved display window 2 and a fragment of this curved display window, the multi-layer interference filter 12 and the curved display screen 7. The display screen 7 consists of a layer of luminescent material (phosphor) 13 and a thin aluminium film 14, referred to as aluminium backing. The display window 2 has an angle of curvature $\phi$ of 16° and is preferably spherical.

Figure 3:
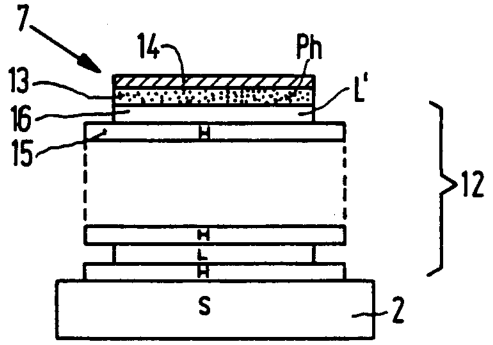

FIG. 3 schematically shows a 20-layer filter 12 between the display screen 7, consisting of a layer of phosphor 13 (Ph) and an aluminium film 14, and the display window 2 (S). This is a flat schematical representation.

The filter in the tube may of course be curved, like the display window and the display screen. The filter consists of $SiO_2$ layers indicated by references L and L' (refractive index n=1.47) and $TiO_2$ layers (n=2.35) denoted by a reference H. The layers each have a thickness of approximately $0.25\lambda_f$. The last H layer 15, which is approximately $0.25\lambda_f$ thick and is located on the side of the display screen 7, is coated with a $0.125\lambda_f$ thick final layer 16 (L'). The phosphor 13 is either a Tb-phosphor where λ=545 nm, or willemite ($Zn_2SiO_4$:Mn) where λ=535 nm. With p=1.22, $\lambda_f$ is equal to 665 nm for Tb and 653 nm for willemite. The composition of the filter with $\lambda_f$ is shown in the following Table.

| Layer number | n | $n.d/\lambda_f$ |
|---|---|---|
| phosphor | | |
| 1 | L | 0.131 |
| 2 | H | 0.260 |
| 3 | L | 0.257 |
| 4 | H | 0.254 |
| 5 | L | 0.251 |
| 6 | H | 0.249 |
| 7 | L | 0.247 |
| 8 | H | 0.246 |
| 9 | L | 0.245 |
| 10 | H | 0.245 |
| 11 | L | 0.244 |
| 12 | H | 0.245 |
| 13 | L | 0.245 |
| 14 | H | 0.246 |
| 15 | L | 0.247 |
| 16 | H | 0.249 |
| 17 | L | 0.251 |
| 18 | H | 0.254 |
| 19 | L | 0.257 |
| 20 | H | 0.260 |
| Display window | 1.57 | 0.260 |

Figure 4:
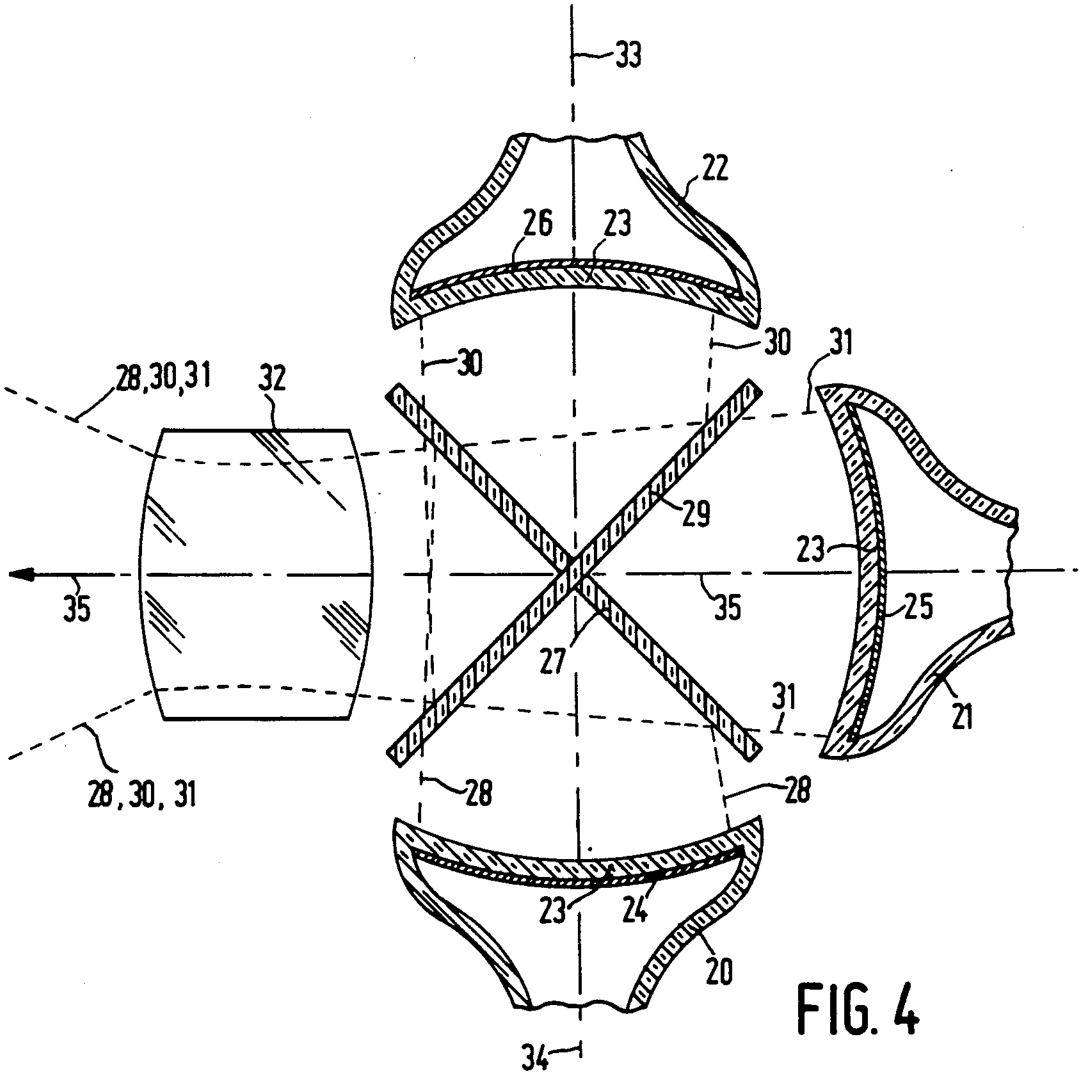
FIG. 4 is a cross-section of a projection television display device.

FIG. 4 schematically shows in a partial cross-section a projection television display device having three projection television display tubes 20, 21 and 22 with display windows 23. Display screens 24, 25, 26 are provided on the display windows. Display screen 24 partly consists of a phosphor layer comprising either a terbium-activated blue-luminescing phosphor with λ=490 nm and p is a number between 1.21 and 1.25, or ZnS: Ag with λ=460 nm and p being a number between 1.26 and 1.32. A $TiO_2$—$SiO_2$ filter is provided between the phosphor and the display window. When (a slight quantity of) Tb is used as an activator, a predominantly blue-luminescing phosphor with λ=490 nm is produced. By choosing p to be between 1.21 and 1.25, hence $\lambda_f$ between 590 and 615 nm a filter is obtained in which the reflection increases relatively steeply for light rays constituting an angle of more than 20° to 35° with the normal on the filter. Then there is a contrast gain of approximately 100% and a 50 to 100% gain in luminous flux in the blue spectrum. In this case there is a considerable colour point improvement because the green spectral lines are filtered out by the multilayer filter. When ZnS:Ag with λ=460 nm and p between 1.26 and 1.32 is used, the blue-green and green parts of the spectrum are filtered out partly and entirely, respectively, resulting in a considerable improvement of the colour purity. For the blue components in the spectrum there is a 40 to 100% gain in luminous flux. There is also a gain in contrast by a factor of more than 2. When there is no interference filter, the green components of the Tb spectrum and the blue-green and green components of the ZnS:Ag spectrum are not reflected or not entirely reflected in the direction of the lens by the blue dichroic mirror, which leads to colour variation across the projection screen and also to loss of contrast through multiple reflections. The use of the intereference filter in combination with the dichroic mirror prevents this problem or reduces it to a considerable extent.

Display screen 25 consists partly of a phorphor layer comprising either a terbium-activated, substantially green-luminescing phosphor with λ=545 nm and p being a number between 1.21 and 1.25 for a $TiO_2$—$SiO_2$ filter, or willemite ($Zn_2SiO_4$:Mn) with λ=535 nm and p being a number between 1.22 and 1.30 for a $TiO_2$—$SiO_2$ filter. Terbium-activated, substantially green-luminescing phosphors are, for example, yttrium aluminium garnet terbium (YAG:Tb), yttrium silicate terbium ($Y_2SiO_5$: Tb), lanthanum oxybromide terbium (LaOBr:Tb) and indium borate terbium ($InBO_3$:Tb). For all these Tb-activated green phosphors the central wavelength λ=545 nm. By choosing p to be between 1.21 and 1.25 for the filter according to the invention, hence $\lambda_f$ between 660 and 680 nm, a filter is obtained having a high reflection for light rays constituting an angle of more than 20° to 35° with the normal on the filter. This filter operates eminently for these Tb-activated phosphors which have emission lines in the blue, green, orange-red and red spectra. Use of the filter leads to a gain in the green spectrum, a much slighter gain in the blue spectrum and a substantially complete reduction of the quantity of light in the red spectrum radiated by the tube, which is favourable for the colour point. All this leads to a gain in luminous flux, colour improvement (closer to the EBU standards) and a gain in contrast. In an optimum filter the total gain in luminous flux is 30 to 60% for all colours for these Tb-activated phosphors. The gain in the green spectrum is 60 to 120%. The coordinates x and y in the CIE chromatically diagram are then 0.26 to 0.30 and 0.60 to 0.68 respectively. Without the filter these coordinates are x=0.33 to 0.36 and y=0.54 to 0.62, respectively. The gain in contrast is more than a factor of 2. When willemite is used as a green phosphor with λ=535 nm and p being a number between 1.22 and 1.30 for a $TiO_2$—$SiO_2$ filter, a filter is obtained having a high transmission (more than 90%) for light rays constituting an angle of less than 20° to 35° with the normal on the filter. For larger angles the transmission decreases quickly and there is reflection. The longer-wave green-yellow and yellow parts of the broad-band willemite spectrum are already reflected at smaller angles. This leads to an increased colour purity. For the green components in the spectrum there is a 40 to 100% gain in luminous flux. There is also gain in contrast. When there is no interference filter, the orange and red components of the Tb spectrum and the green-yellow and yellow components of the willemite spectrum are not passed or not completely passed by the red dichroic mirror. This leads to colour variation across the the projection screen and to loss of contrast through multiple reflections. The use of the interference filter in combination with the dichroic mirror according to the invention prevents this problem or reduces it to a considerable extent.

Display screen 26 consists partly of a phosphor layer comprising a europium-activated, substantially red-luminescing phosphor. The europium-activated yttrium oxide ($Y_2O_3$:Eu) has a λ of 612 nm and p is a number between 1.21 and 1.25 for a $TiO_2$—$SiO_2$ filter. By this choice of p between 1.25 and 1.25, hence $\lambda_f$ between 740 and 765 nm, the reflection of the filter for light rays constituting an angular of more than 20° to 35° with the normal on the filter greatly increases. There is now a gain of 60 to 120% in total luminous flux, compared with a tube without filter. The gain in contrast is approximately 100%. In this case there is a slight improvement of the colour point. In fact, the red components in the spectrum of the generated light are more intensified than the components having a shorter wavelength. The display windows are curved with $\phi=18°$ in the device. They may, however, also be flat. The combination of the rays from the tubes 20, 21 and 22 is obtained in that the rays of the blue tube are reflected by mirror 27 constituting an angle of 45° with axis 35, which is schematically denoted by the broken lines 28. The rays of the red tube 22 are reflected by mirror 29, which likewise constitutes an angle of 45° with axis 35, which is schematically shown by the broken lines 30. The rays of the green tube 21 are passed by the red and blue-reflecting mirrors 27 and 29, which is denoted by the broken lines 31. The light rays combined in this manner are projected onto a projection screen by means of an aspherical lens 32, and a colour image is formed on the screen. The optical axes 33 and 34 of the tubes 22 and 20 coincide and are co-planar with the optical axis 35 of tube 21 perpendicular to the axes 33 and 34, which axis 35 is also the optical main axis of the system. In the embodiment shown in FIG. 4 there are no lens elements between the display screen and the dichroic mirrors. Also when the interference filters according to the invention are used, it is, however, possible to place the first two lens elements between the display screen and the dichroic mirrors and the further lens elements behind the dichroic mirrors, as is common practice in dichroic projectors without interference filters.

Instead of $TiO_2$—$SiO_2$ multilayer intereference filters as described hereinbefore, it is alternatively possible to use $Ta_2O_5$—$SiO_2$ multilayer interference layers as described in U.S. Pat. Nos. 4,634,928 and 4,683,698.

What is claimed is:

1. A projection television display device having a main axis and comprising first, second, and third monochrome projection television display tubes each having a display window with a display screen provided on the inside thereof, each screen having luminescent material which luminesces in a different color with a desired central wavelength, each said tube having an optical axis extending perpendicularly from the center of the display screen, the optical axes of the three display screens being co-planar and intersecting at a point, the axes of the display screens of the first and second tubes coinciding, the axis of the display window of the third tube constituting the main axis of the device, said main axis being perpendicular to the two coincident axis, said device further comprising first and second flat dichroic intersecting reflective mirrors extending perpendicularly of the plane of the axes and through the point of intersection of the axes at an angle of 45° with the main axis, the first mirror reflecting the image of the display screen of the first tube and the second mirror reflecting the image of the display screen of the second tube in the direction of the main axis and away from the display screen of the third tube, filters being disposed between said display screens and said mirrors for passing predetermined colors of light, characterized in that said filters are interference filters disposed between the luminescent material of the respective display screen and the display windows, each said filter having layers with thicknesses chosen so that the reflection at the respective central wavelength increases greatly for light rays constituting an angle of more than 20° to 35° with the normal to the filter.

2. A projection television display device as claimed in claim 1, characterized in that the inside of the display window is flat to convex with a maximum angle of curvature $\phi=18°$, where $\phi$ is the angle between the optical axis and a line perpendicular to the part of the display screen which is most remote from the centre of the display screen.

3. A projection television display device as claimed in claim 1, characterized in that each said intereference filter comprises at least six layers alternately made from a material having a high reference index and from a material having a low refractive index, each said layer having an optical thickness nd, where n is the refractive index of the material of the layer and d is the thickness, said optical thickness nd being between $0.2\lambda_f$ and $0.3\lambda_f$ where $\lambda_f$ equal to $p\times\lambda$ and $\lambda$ is the desired central wavelength selected from the spectrum emitted by the luminescent material of the respective display screen and p is a number between 1.18 and 1.32.

4. A projection television display device as claimed in claim 3, characterized in that each said filter is composed of 14 to 30 of said layers.

5. A projection television display device as claimed in claim 4, characterized in that the optical thickness nd is between $0.23\lambda_f$ and $0.27\lambda_f$.

* * * * *